United States Patent
Tojyo

[11] 4,150,871
[45] Apr. 24, 1979

[54] MICROSCOPE OBJECTIVE LENS SYSTEM

[75] Inventor: Tsutomu Tojyo, Hachiouji, Japan

[73] Assignee: Olympus Optical Co., Ltd., Tokyo, Japan

[21] Appl. No.: 786,937

[22] Filed: Apr. 12, 1977

[30] Foreign Application Priority Data

Apr. 13, 1976 [JP] Japan .................................. 51/41674

[51] Int. Cl.² .................... G02B 21/02; G02B 11/30
[52] U.S. Cl. ............................. 350/175 ML; 350/219
[58] Field of Search .................... 350/175 ML, 219

[56] References Cited

U.S. PATENT DOCUMENTS 3,537,773  11/1970  Klein .................. 350/219

Primary Examiner—Conrad J. Clark
Attorney, Agent, or Firm—Cushman, Darby & Cushman

[57] ABSTRACT

A low magnification microscope objective lens system which comprises a small number of lenses and wherein lateral chromatic aberration is controlled to a level similar to that in high magnification microscope objective lens systems while maintaining flatness of image.

4 Claims, 17 Drawing Figures

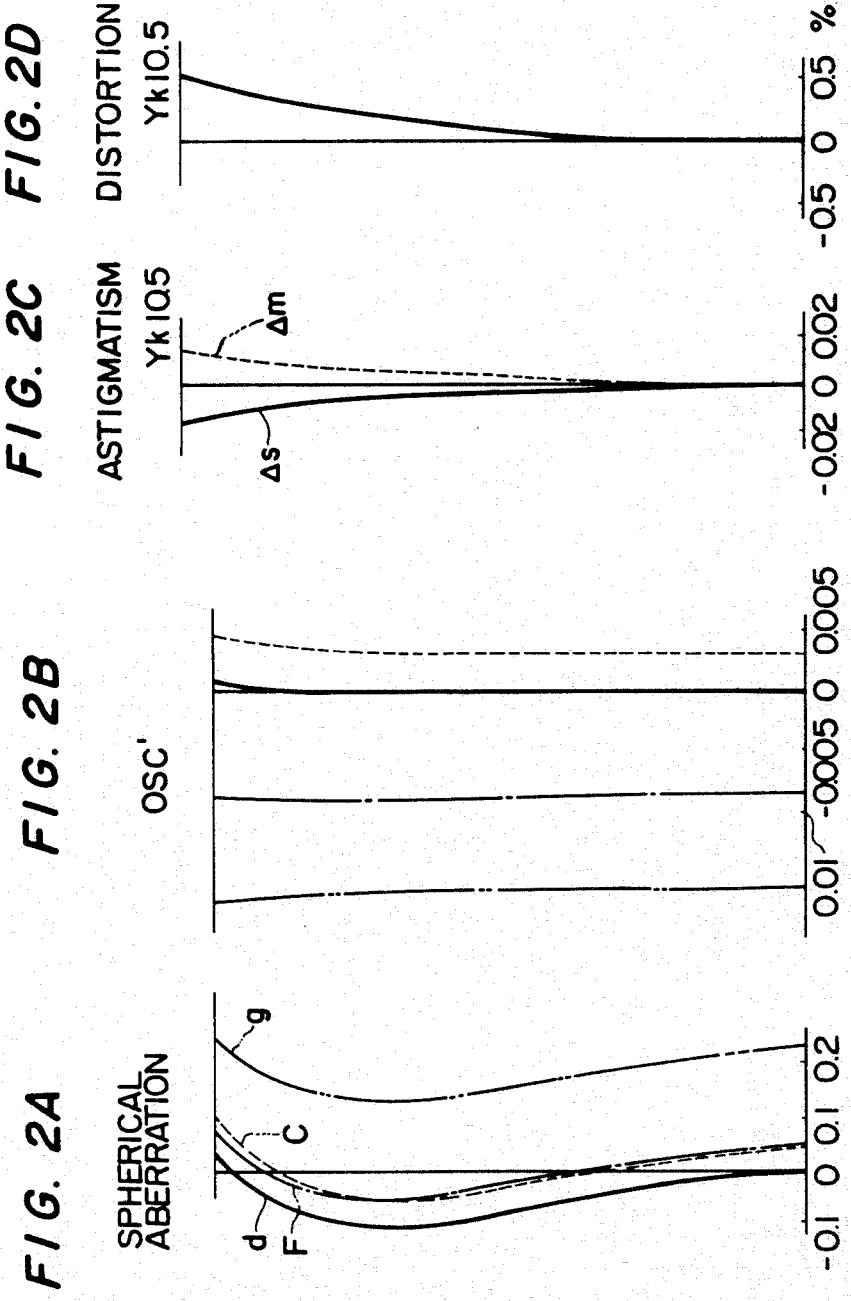

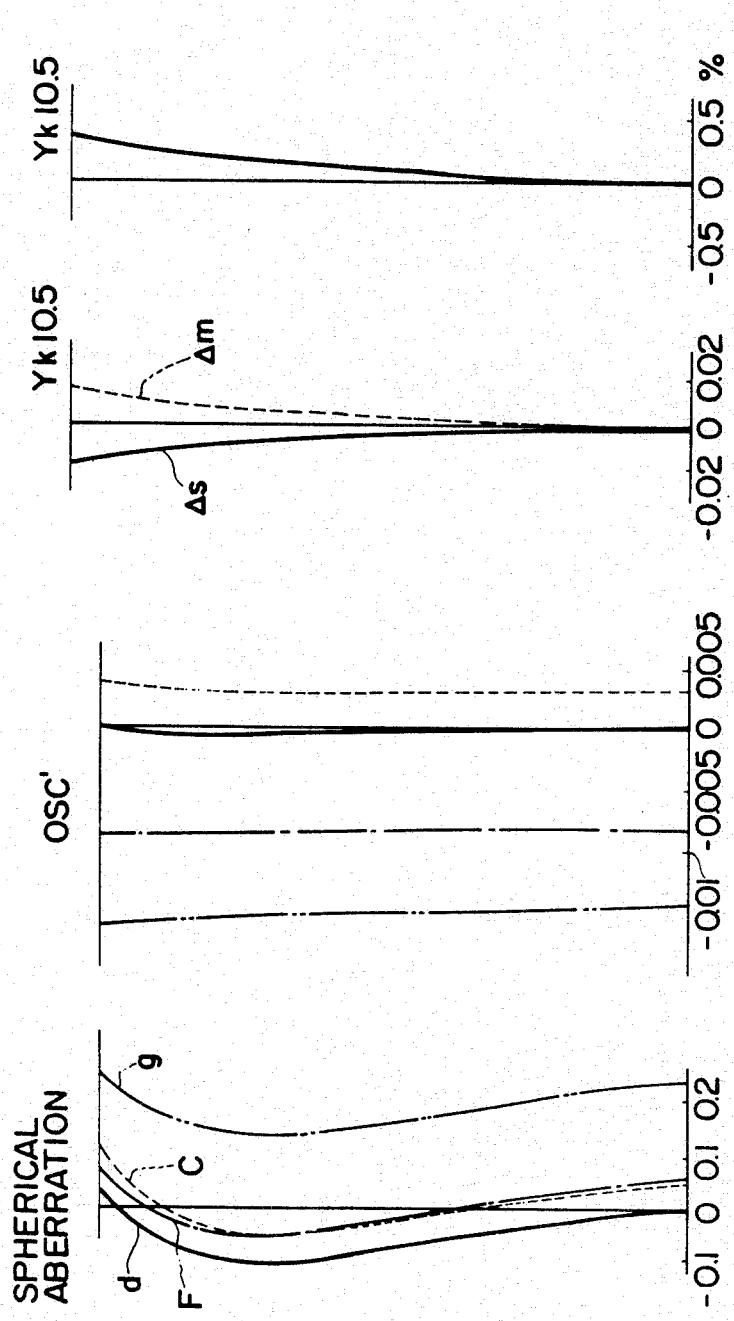

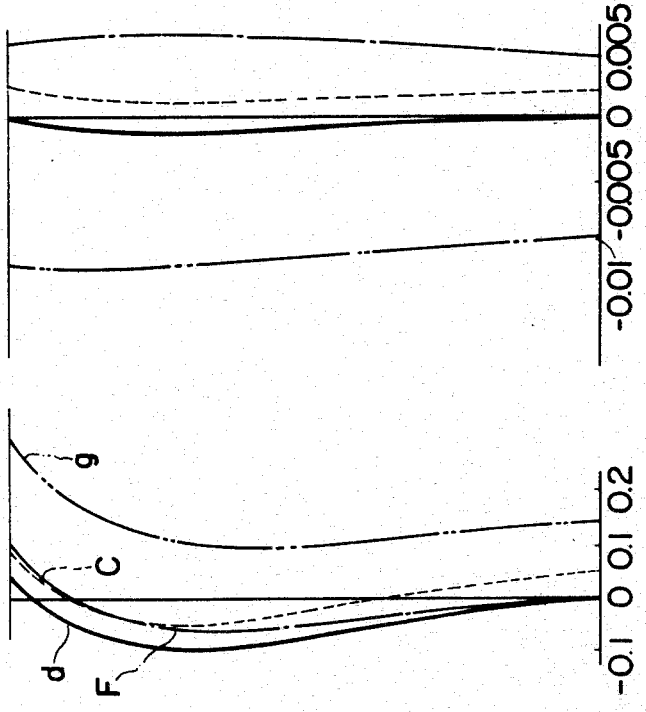
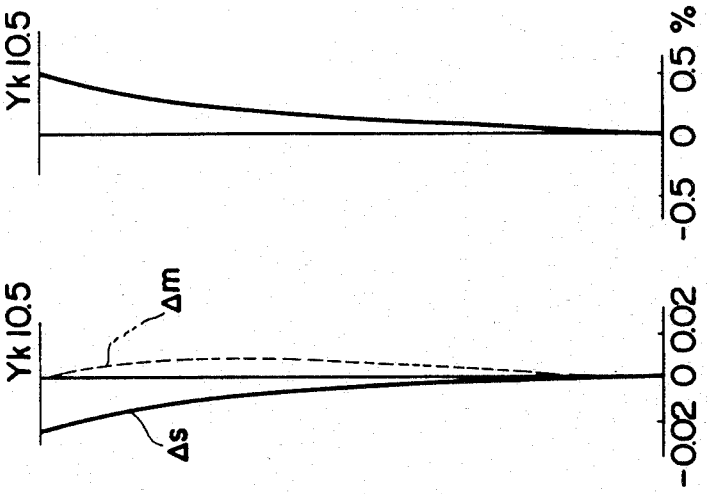
FIG. 4A  FIG. 4B  FIG. 4C  FIG. 4D

MICROSCOPE OBJECTIVE LENS SYSTEM

BACKGROUND OF THE INVENTION (a) Field of the Invention

The present invention relates to a microscope objective lens system designed for low magnification on the order of 10x.

(b) Description of the Prior Art

Conventional microscope objective lens systems designed for low magnification, especially on the order of 10x and improved flatness of image comprise a large number of lens elements and have short working distance (W.D.). Further, lateral chromatic aberration is aggravated and can hardly be corrected in miscrocope objective lens systems for high magnification levels though such aberration can be favorably corrected relatively easily in microscope objective lens systems for low magnification levels. For this reason, lateral chromatic aberration is not corrected in high magnification microscope objective lens systems and is corrected later by eyepieces so that such aberration is favorably corrected in the entire optical systems of microscopes. When a low magnification objective lens system is used in combination with an eyepiece so designed as to correct lateral chromatic aberration produced by a high magnification microscope objective lens system, lateral chromatic aberration will unavoidably be produced in the reverse direction.

SUMMARY OF THE INVENTION

A general object of the present invention is to provide a low magnification microscope lens system comprising a small number of lens elements, assuring improved flatness of image and producing lateral chromatic aberration on the order similar to that in high magnification microscope objective lens systems.

The microscope objective lens system according to the present invention comprises a first positive lens, a second positive meniscus lens, a third negative lens, a fourth positive meniscus lens and a fifth positive lens. Said objective lens system satisfies the conditions defined below:

(1) $0.3F < r_3 < 1.2f$
(2) $-0.5f < r_5 < -0.15f$
(3) $0.15f < d_4 < 0.5f$
(4) $0.35d_4 < \frac{d_5}{n_3} + d_6 + \frac{d_7}{n_4} < 1.25d_4$
(5) $|\nu_1 - \nu_2| < 10, |n_1 - n_2| > 0.05$
(6) $0.5f < |r_1| < 4f$ wherein the reference symbols represent as follows: $r_1$, $r_3$, $r_5$: radii of curvature on the respective object side surfaces of the first, second and third lenses $d_4$: airspace between the second and third lenses $d_6$: airspace between the third and fourth lenses $d_5$, $d_7$: thicknesses of the third and fourth lenses respectively $n_1$, $n_2$, $n_3$, $n_4$: refractive indices of the first, second, third and fourth lenses respectively $\nu_1$, $\nu_2$: Abbe's numbers of the first and second lenses respectively f: focal length of the entire lens system as a whole.

Now, the significance of the afore-mentioned conditions will be described below: The conditions (1) and (2) are adopted for favorably correcting spherical aberration and coma while maintaining curvature of field at a desirable level. That is to say, aforesaid aberrations are favorably corrected by selecting a meniscus lens as the second element and so designing the third lens as to have a strongly concave surface $r_5$ on the object side. If either one of $r_3$ and $r_5$ is smaller than the lower limit of the conditions (1) or (2), it will be difficult to correct curvature of field and it will be impossible to maintain favorable flatness of image. When $r_3$ or $r_5$ exceeds the upper limit of the condition (1) or (2), in contrast, it will be impossible to favorably correct spherical aberration and coma.

The condition (3) is effective mainly for correcting coma favorably. If $d_4$ is smaller than the lower limit defined by the condition (3), coma and astigmatic difference will be overcorrected. If $d_4$ is larger than the upper limit of the condition (3), however, proper balance will be lost among various aberrations.

The conditions (4) and (5) are adopted for favorably correcting spherical aberration while maintaining lateral chromatic aberration at a degree similar to that in high magnification microscope objective lens systems. The lens system according to the present invention is so designed as to have an OSC' value larger than those of general objective lens systems. That is to say, C line has an OSC' value of approx. 0.24~0.35% and F line has an OSC' value of approx. 0.56~0.86. If $d_5/n_3 + d_6 + d_7/n_4$ has a value larger than the upper limit defined by the condition (4), it will be impossible to maintain proper balance in correction of spherical aberration. If aforesaid value is smaller than the lower limit of the condition (4), in contrast, it will be impossible to control lateral chromatic aberration to the level similar to that in high magnification objective lens systems. If $|\nu_1 - \nu_2|$ exceeds 10 in the condition (5), it will be impossible to increase lateral chromatic aberration to the level similar to that in high magnification objective lens systems. When $|n_1 - n_2|$ is smaller than 0.05 in the condition (4) in contrast, it will be impossible to favorably correct spherical aberration while maintaining lateral chromatic aberration to a level similar to that in high magnification objective lens systems. Finally, the condition (6) is required mainly for correcting spherical aberration favorably. If $|r_1|$ exceeds the upper limit of the condition (6), it will be difficult to correct spherical aberration. If $|r_1|$ is smaller than the lower limit of the condition (6), proper balance will be lost among various aberrations, especially aggravating coma and astigmatism.

Furthermore, it is preferable to select a glass material having a high refractive index and low dispersion for the third lens in order to maintain favorable flatness of image.

BRIEF DESCRIPTION OF THE DRAWINGS

FIG. 2A through FIG. 2D show curves illustrating the aberration characteristics of the Embodiment 1;

FIG. 3A through FIG. 3D show curves illustrating the aberration characteristics of the Embodiment 2;

FIG. 4A through FIG. 4D illustrate graphs showing the aberration characteristics of the Embodiment 3.

DESCRIPTION OF THE PREFERRED EMBODIMENTS

Figure 1:
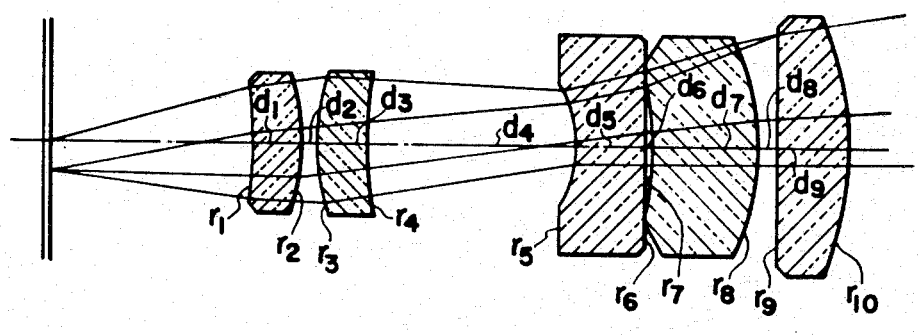
FIG. 1 shows a sectional view illustrating the composition of the lens system accoreing to the present invention.
Figures 5A, 5B, 5C, 5D:
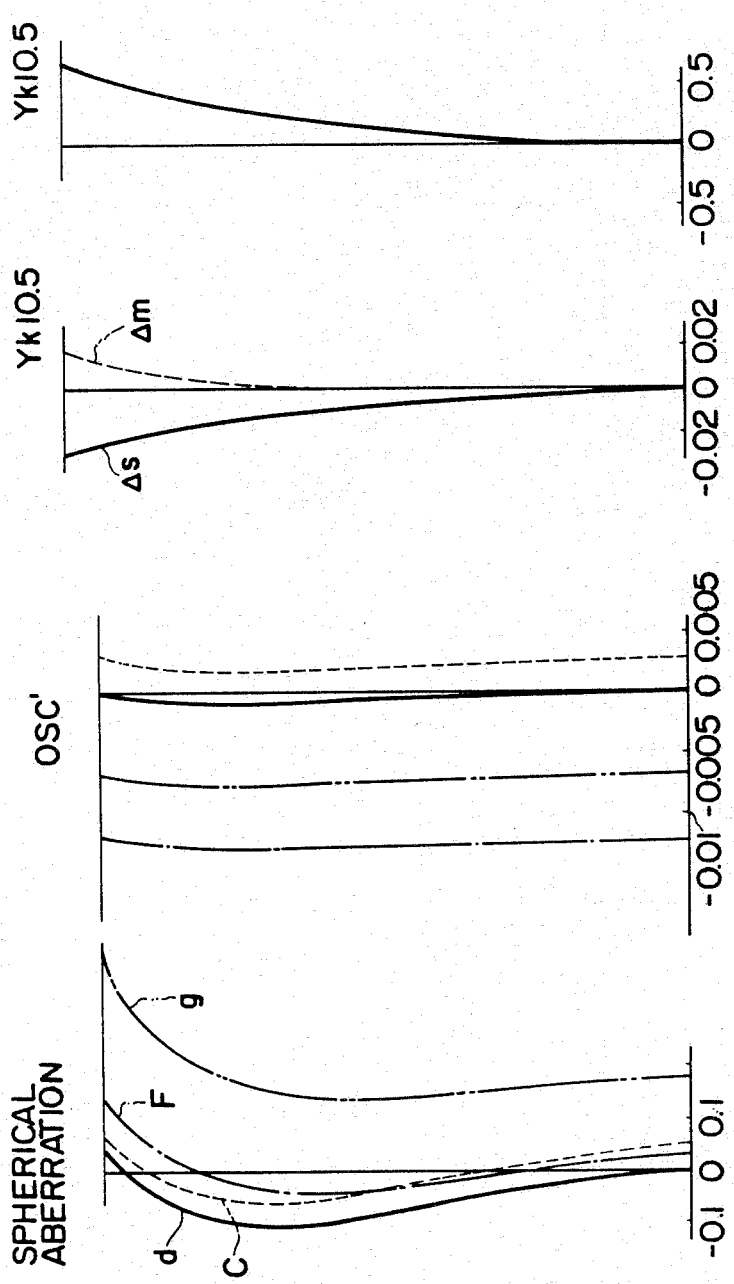
FIG. 5A through FIG. 5D illustrate graphs showing the abeeration characteristics of the Embodiment 4.

Now, some preferred embodiments of the present invention will be detailedly described below:

Embodiment 1

| $f = 1$ | $NA = 0.25$ | $\beta = -9.977$ |
|---|---|---|
| $WD = 0.3980$ | | Petzval sum 0.20 |

| $r_1 = -1.6154$ | | | |
| | $d_1 = 0.0940$ | $n_1 = 1.72916$ | $\nu_1 = 54.7$ |
| $r_2 = -0.4890$ | | | |
| | $d_2 = 0.0281$ | | |
| $r_3 = 0.3617$ | | | |
| | $d_3 = 0.1055$ | $n_2 = 1.64$ | $\nu_2 = 60.2$ |
| $r_4 = 1.0714$ | | | |
| | $d_4 = 0.4012$ | | |
| $r_5 = -0.1965$ | | | |
| | $d_5 = 0.1307$ | $n_3 = 1.80518$ | $\nu_3 = 25.4$ |
| $r_6 = \infty$ | | | |
| | $d_6 = 0.0075$ | | |
| $r_7 = -1.3286$ | | | |
| | $d_7 = 0.2132$ | $n_4 = 1.62299$ | $\nu_4 = 58.2$ |
| $r_8 = -0.4663$ | | | |
| | $d_8 = 0.0344$ | | |
| $r_9 = -12.9551$ | | | |
| | $d_9 = 0.1399$ | $n_5 = 1.64250$ | $\nu_5 = 58.4$ |
| $r_{10} = -0.6018$ | | | |

Embodiment 2

| $f = 1$ | $NA = 0.25$ | $\beta = -9.999$ |
|---|---|---|
| $WD = 0.4083$ | | Petzval sum 0.2 |

| $r_1 = -1.3336$ | | | |
| | $d_1 = 0.0964$ | $n_1 = 1.755$ | $\nu_1 = 52.4$ |
| $r_2 = -0.5108$ | | | |
| | $d_2 = 0.0296$ | | |
| $r_3 = 0.3588$ | | | |
| | $d_3 = 0.1079$ | $n_2 = 1.64$ | $\nu_2 = 60.2$ |
| $r_4 = 1.1284$ | | | |
| | $d_4 = 0.3806$ | | |
| $r_5 = -0.2050$ | | | |
| | $d_5 = 0.1332$ | $n_3 = 1.80518$ | $\nu_3 = 25.4$ |
| $r_6 = \infty$ | | | |
| | $d_6 = 0.0127$ | | |
| $r_7 = -1.3245$ | | | |
| | $d_7 = 0.2177$ | $n_4 = 1.62299$ | $\nu_4 = 58.2$ |
| $r_8 = -0.4754$ | | | |
| | $d_8 = 0.0289$ | | |
| $r_9 = 36.3549$ | | | |
| | $d_9 = 0.1387$ | $n_5 = 1.6425$ | $\nu_5 = 58.4$ |
| $r_{10} = -0.6668$ | | | |

Embodiment 3

| $f = 1$ | $NA = 0.25$ | $\beta = -10.0$ |
|---|---|---|
| $WD = 0.4122$ | | Petzual sum 0.25 |

| $r_1 = 0.7385$ | | | |
| | $d_1 = 0.0976$ | $n_1 = 1.7725$ | $\nu_1 = 49.6$ |
| $r_2 = -0.8133$ | | | |
| | $d_2 = 0.0296$ | | |
| $r_3 = 1.1096$ | | | |
| | $d_3 = 0.1065$ | $n_2 = 1.691$ | $\nu_2 = 54.8$ |
| $r_4 = 5.9537$ | | | |
| | $d_4 = 0.2661$ | | |
| $r_5 = -0.2321$ | | | |
| | $d_5 = 0.1325$ | $n_3 = 1.84666$ | $\nu_3 = 23.9$ |
| $r_6 = \infty$ | | | |
| | $d_6 = 0.0138$ | | |
| $r_7 = -0.4858$ | | | |
| | $d_7 = 0.2189$ | $n_4 = 1.618$ | $\nu_4 = 63.4$ |
| $r_8 = -0.3832$ | | | |
| | $d_8 = 0.0849$ | | |
| $r_9 = 2.8955$ | | | |
| | $d_9 = 0.1159$ | $n_5 = 1.618$ | $\nu_5 = 63.4$ |
| $r_{10} = -0.8358$ | | | |

Embodiment 4

| $f = 1$ | $NA = 0.25$ | $\beta = -10.0$ |
|---|---|---|
| $WD = 0.4187$ | | Petzval sum 0.25 |

| $r_1 = 3.6219$ | | | |
| | $d_1 = 0.0988$ | $n_1 = 1.7859$ | $\nu_1 = 44.1$ |
| $r_2 = -0.4897$ | | | |
| | $d_2 = 0.0305$ | | |
| $r_3 = 0.3711$ | | | |
| | $d_3 = 0.1109$ | $n_2 = 1.6935$ | $\nu_2 = 53.3$ |
| $r_4 = 0.3933$ | | | |
| | $d_4 = 0.2297$ | | |
| $r_5 = -0.2429$ | | | |
| | $d_5 = 0.1368$ | $n_3 = 1.84666$ | $\nu_3 = 23.9$ |
| $r_6 = \infty$ | | | |
| | $d_6 = 0.0135$ | | |
| $r_7 = -0.9266$ | | | |
| | $d_7 = 0.2235$ | $n_4 = 1.48749$ | $\nu_4 = 70.1$ |
| $r_8 = -0.3829$ | | | |
| | $d_8 = 0.0766$ | | |
| $r_9 = 5.1828$ | | | |
| | $d_9 = 0.1497$ | $n_5 = 1.618$ | $\nu_5 = 63.4$ |
| $r_{10} = -0.7975$ | | | | wherein the reference symbols $r_1$ through $r_{10}$ represent radii of curvature on the respective surfaces of the first through the fifth lenses, the reference symbols $d_1$ through $d_9$ designate thicknesses of the respective lenses and airspaces therebetween and the reference symbols $\nu_1$ through $\nu_5$ denote Abbe's numbers of the respective lenses.

I claim:

1. An objective lens system for microscopes comprising a first positive lens, a second positive meniscus lens, a third negative lens, a fourth positive meniscus lens and a fifth positive meniscus lens, and said lens system having the following numerical data:

| $f = 1$ | $NA = 0.25$ | $\beta = -9.977$ |
|---|---|---|
| $WD = 0.3980$ | | Petzval sum 0.20 |

| $r_1 = -1.6154$ | | | |
| | $d_1 = 0.0940$ | $n_1 = 1.72916$ | $\nu_1 = 54.7$ |
| $r_2 = -0.4890$ | | | |
| | $d_2 = 0.0281$ | | |
| $r_3 = 0.3617$ | | | |
| | $d_3 = 0.1055$ | $n_2 = 1.64$ | $\nu_2 = 60.2$ |
| $r_4 = 1.0714$ | | | |
| | $d_4 = 0.4012$ | | |
| $r_5 = -0.1965$ | | | |
| | $d_5 = 0.1307$ | $n_3 = 1.80518$ | $\nu_3 = 25.4$ |
| $r_6 = \infty$ | | | |
| | $d_6 = 0.0075$ | | |
| $r_7 = -1.3286$ | | | |
| | $d_7 = 0.2132$ | $n_4 = 1.62299$ | $\nu_4 = 58.2$ |
| $r_8 = -0.4663$ | | | |
| | $d_8 = 0.0344$ | | |
| $r_9 = -12.9551$ | | | |
| | $d_9 = 0.1399$ | $n_5 = 1.64250$ | $\nu_5 = 58.4$ |
| $r_{10} = -0.6018$ | | | | wherein the reference symbol f represents focal length of the entire lens system as a whole, the reference symbols $r_1$ through $r_{10}$ designate radii of curvature on the respective surfaces of the lenses, the reference symbols $d_1$ through $d_9$ denote thicknesses of the respective lenses and the airspace therebetween, the reference symbols $n_1$ through $n_5$ represent refractive indices of the respective lenses and the reference symbols $\nu_1$ through $\nu_5$ designate Abbe's numbers of the respective lenses.

2. An objective lens system for microscopes comprising a first positive lens, a second positive meniscus lens, a third negative lens, a fourth positive meniscus lens and a fifth positive meniscus lens, and said lens system having the following numerical data:

| $f = 1$ | $NA = 0.25$ | $\beta = -9.999$ |
|---|---|---|
| $WD = 0.4083$ | | Petzval sum 0.2 |

| $r_1 = -1.3336$ | | | |
| | $d_1 = 0.0964$ | $n_1 = 1.755$ | $\nu_1 = 52.4$ |
| $r_2 = -0.5108$ | | | |
| | $d_2 = 0.0296$ | | |
| $r_3 = 0.3588$ | | | |
| | $d_3 = 0.1079$ | $n_2 = 1.64$ | $\nu_2 = 60.2$ |
| $r_4 = 1.1284$ | | | |
| | $d_4 = 0.3806$ | | |
| $r_5 = -0.2050$ | | | |
| | $d_5 = 0.1332$ | $n_3 = 1.80518$ | $\nu_3 = 25.4$ |
| $r_6 = \infty$ | | | |
| | $d_6 = 0.0127$ | | |
| $r_7 = -1.3245$ | | | |

-continued

| | | | |
|---|---|---|---|
| $r_8 = -0.4754$ | $d_7 = 0.2177$ | $n_4 = 1.62299$ | $\nu_4 = 58.2$ |
| | $d_8 = 0.0289$ | | |
| $r_9 = 36.3549$ | | | |
| | $d_9 = 0.1387$ | $n_5 = 1.6425$ | $\nu_5 = 58.4$ |
| $r_{10} = -.06668$ | | | | wherein the reference symbol f represents focal length of the entire lens system as a whole, the reference symbols $r_1$ through $r_{10}$ designate radii of curvature on the respective surfaces of the lenses, the reference symbols $d_1$ through $d_9$ denote thicknesses of the respective lenses and the airspaces therebetween, the reference symbols $n_1$ through $n_5$ represent refractive indices of the respective lenses and the reference symbols $\nu_1$ through $\nu_5$ designate Abbe's numbers of the respective lenses.

3. An objective lens system for microscopes comprising a first positive lens, a second positive meniscus lens, a third negative lens, a fourth positive meniscus lens and a fifth positive meniscus lens, and said lens system having the following numerical data:

| | | | |
|---|---|---|---|
| $f = 1$ | | $NA = 0.25$ | $\beta = -10.0$ |
| $WD = 0.4122$ | | | Petzval sum 0.25 |
| $r_1 = 0.7385$ | | | |
| | $d_1 = 0.0976$ | $n_1 = 1.7725$ | $\nu_1 = 49.6$ |
| $r_2 = -0.8133$ | | | |
| | $d_2 = 0.0296$ | | |
| $r_3 = 1.1096$ | | | |
| | $d_3 = 0.1065$ | $n_2 = 1.691$ | $\nu_2 = 54.8$ |
| $r_4 = 5.9537$ | | | |
| | $d_4 = 0.2661$ | | |
| $r_5 = -0.2321$ | | | |
| | $d_5 = 0.1325$ | $n_3 = 1.84666$ | $\nu_3 = 23.9$ |
| $r_6 = \infty$ | | | |
| | $d_6 = 0.0138$ | | |
| $r_7 = -0.4858$ | | | |
| | $d_7 = 0.2189$ | $n_4 = 1.618$ | $\nu_4 = 63.4$ |
| $r_8 = -0.3832$ | | | |
| | $d_8 = 0.0849$ | | |
| $r_9 = 2.8955$ | | | |
| | $d_9 = 0.1159$ | $n_5 = 1.618$ | $\nu_5 = 63.4$ |
| $r_{10} = -0.8358$ | | | | wherein the reference symbol f represents focal length of the entire lens system as a whole, the reference symbols $r_1$ through $r_{10}$ designate radii of curvature on the respective surfaces of the lenses, the reference symbols $d_1$ through $d_9$ denote thicknesses of the respective lenses and the airspaces therebetween, the reference symbols $n_1$ through $n_5$ represent refractive indices of the respective lenses and the reference symbols $\nu_1$ through $\nu_5$ designate Abbe's numbers of the respective lenses.

4. An objective lens system for microscopes comprising a first positive lens, a second positive meniscus lens, a third negative lens, a fourth positive meniscus lens and a fifth positive meniscus lens, and said lens system having the following numerical data:

| | | | |
|---|---|---|---|
| $f = 1$ | | $NA = 0.25$ | $\beta = -10.0$ |
| $WD = 0.4187$ | | | Petzval sum 0.25 |
| $r_1 = 3.6219$ | | | |
| | $d_1 = 0.0988$ | $n_1 = 1.7859$ | $\nu_1 = 44.1$ |
| $r_2 = -0.4897$ | | | |
| | $d_2 = 0.0305$ | | |
| $r_3 = 0.3711$ | | | |
| | $d_3 = 0.1109$ | $n_2 = 1.6935$ | $\nu_2 = 53.3$ |
| $r_4 = 0.3933$ | | | |
| | $d_4 = 0.2297$ | | |
| $r_5 = -0.2429$ | | | |
| | $d_5 = 0.1368$ | $n_3 = 1.84666$ | $\nu_3 = 23.9$ |
| $r_6 = \infty$ | | | |
| | $d_6 = 0.0135$ | | |
| $r_7 = -0.9266$ | | | |
| | $d_7 = 0.2235$ | $n_4 = 1.48749$ | $\nu_4 = 70.1$ |
| $r_8 = -0.3829$ | | | |
| | $d_8 = 0.0766$ | | |
| $r_9 = 5.1828$ | | | |
| | $d_9 = 0.1497$ | $n_5 = 1.618$ | $\nu_5 = 63.4$ |
| $r_{10} = -0.7975$ | | | | wherein the reference symbol f represents focal length of the entire lens system as a whole, the reference symbols $r_1$ through $r_{10}$ designate radii of curvature on the respective surfaces of the lenses, the reference symbols $d_1$ through $d_9$ denote thicknesses of the respective lenses and the airspaces therebetween, the reference symbols $n_1$ through $n_5$ represent refractive indices of the respective lenses and the reference symbols $\nu_1$ and $\nu_5$ designate Abbe's numbers of the respective lenses.

* * * * *